US011999588B2

(12) United States Patent
Akkina et al.

(10) Patent No.: US 11,999,588 B2
(45) Date of Patent: Jun. 4, 2024

(54) DYNAMIC CAR ASSIGNMENT PROCESS

(71) Applicant: Otis Elevator Company, Farmington, CT (US)

(72) Inventors: Vinod Akkina, Telangana (IN); Sandyarani Kolli, Telangana (IN)

(73) Assignee: OTIS ELEVATOR COMPANY, Farmington, CT (US)

( * ) Notice: Subject to any disclaimer, the term of this patent is extended or adjusted under 35 U.S.C. 154(b) by 1377 days.

(21) Appl. No.: 16/456,285

(22) Filed: Jun. 28, 2019

(65) Prior Publication Data

US 2020/0031612 A1 Jan. 30, 2020

(30) Foreign Application Priority Data

Jul. 25, 2018 (IN) ............................ 201811028020

(51) Int. Cl.

*B66B 1/24* (2006.01)
*B66B 1/46* (2006.01)
*B66B 5/00* (2006.01)

(52) U.S. Cl.

CPC ............ *B66B 1/2458* (2013.01); *B66B 1/468* (2013.01); *B66B 5/0012* (2013.01); (Continued)

(58) Field of Classification Search

CPC ..... B66B 1/2458; B66B 1/468; B66B 5/0012; B66B 2201/222; B66B 2201/4638; (Continued)

(56) References Cited

U.S. PATENT DOCUMENTS 8,505,692 B2 8/2013 Tokura et al.
9,957,132 B2 5/2018 Berryhill
(Continued)

FOREIGN PATENT DOCUMENTS

CN 104495538 A 4/2015
CN 106429662 A 2/2017
(Continued)

OTHER PUBLICATIONS

Pepyne, D.L., et al., "Optimal dispatching control for elevator systems during uppeak traffic", Abstract, IEEE Transactions on Control Systems Technology, vol. 5, Issue 6, Nov. 1997, 1 page.
(Continued)

*Primary Examiner* — Jeffrey Donels
(74) *Attorney, Agent, or Firm* — CANTOR COLBURN LLP

(57) ABSTRACT

A dynamic car assignment method implemented by an elevator system is provided. The elevator system includes a plurality of elevators. The dynamic car assignment method includes an assignment, by the elevator system, of a first elevator car of the plurality of elevators to pick up a passenger in response to an elevator call. The elevator system then detects that the first elevator car is fully occupied prior to the first elevator car arriving to pick up the passenger. Further, the elevator system dynamically assigns a second elevator car of the plurality of elevator cars to pick up the passenger in response to the elevator call and in response to detecting that the first elevator car is fully occupied.

14 Claims, 4 Drawing Sheets

(52) U.S. Cl.
CPC . *B66B 2201/222* (2013.01); *B66B 2201/4638* (2013.01); *B66B 2201/4653* (2013.01)

(58) Field of Classification Search
CPC . B66B 2201/4653; B66B 1/3476; B66B 1/18; B66B 1/3446; B66B 2201/463
See application file for complete search history.

(56) References Cited

U.S. PATENT DOCUMENTS

| | | | | |
|---|---|---|---|---|
| 10,308,477 | B2 * | 6/2019 | Patel | B66B 1/2458 |
| 10,513,416 | B2 * | 12/2019 | Fang | G05B 19/042 |
| 10,640,329 | B2 * | 5/2020 | Simcik | B66B 1/3461 |
| 10,822,196 | B2 * | 11/2020 | Fauconnet | B66B 1/3476 |
| 2016/0122157 | A1 | 5/2016 | Keser | |
| 2016/0130113 | A1 | 5/2016 | Tokura | |
| 2016/0251199 | A1 | 9/2016 | Kronkvist et al. | |
| 2016/0297642 | A1 * | 10/2016 | Finn | B66B 1/3476 |
| 2016/0311647 | A1 | 10/2016 | Peterson et al. | |
| 2017/0291792 | A1 | 10/2017 | Scoville et al. | |
| 2018/0093853 | A1 | 4/2018 | Kuusinen et al. | |
| 2018/0111787 | A1 * | 4/2018 | Patel | B66B 1/2458 |

FOREIGN PATENT DOCUMENTS

| | | | | |
|---|---|---|---|---|
| EP | 3281904 | A1 * | 2/2018 | B66B 1/14 |
| JP | 2014118263 | A | 6/2014 | |
| KR | 20170139272 | A | 12/2017 | |
| WO | 2016146357 | A1 | 9/2016 | |
| WO | 2019043061 | A1 | 3/2019 | |

OTHER PUBLICATIONS

European Search Report for application EP 19188480.8, dated Nov. 28, 2019, 10 pages.

* cited by examiner

DYNAMIC CAR ASSIGNMENT PROCESS

FOREIGN PRIORITY

This application claims priority to Indian Patent Application No. 201811028020, filed Jul. 25, 2018, and all the benefits accruing therefrom under 35 U.S.C. § 119, the contents of which in its entirety are herein incorporated by reference.

BACKGROUND

When requesting an elevator transport, whether by a hall button of a lobby or an application of a mobile device, a user receives a car assignment and waits for the assigned elevator at a designated area. In some cases, by the time elevator has arrived for the user, the elevator is fully occupied and cannot provide the elevator transport.

BRIEF SUMMARY

According to one or more embodiments, a dynamic car assignment method implemented by an elevator system is provided. The elevator system includes a plurality of elevators. The dynamic car assignment method includes an assignment, by the elevator system, of a first elevator car of the plurality of elevators to pick up a passenger in response to an elevator call. The elevator system then detects that the first elevator car is fully occupied prior to the first elevator car arriving to pick up the passenger. Further, the elevator system dynamically assigns a second elevator car of the plurality of elevator cars to pick up the passenger in response to the elevator call and in response to detecting that the first elevator car is fully occupied.

According to one or more embodiments or the dynamic car assignment method embodiment above, the elevator call can be a hall call received from a lobby. The hall call can be initiated by the passenger waiting in the lobby for one of the plurality of elevators, with none of the plurality of elevators being located at a same floor as the lobby at the time of the hall call.

According to one or more embodiments or any of the dynamic car assignment method embodiments above, the elevator system can utilizes a sensor to detect an occupancy of the first elevator car to determine whether the occupancy is less than a total occupancy limit for the first elevator car. The elevator system can assign the first elevator car when the occupancy of the first elevator car is less than the total occupancy limit for the first elevator car.

According to one or more embodiments or any of the dynamic car assignment method embodiments above, the elevator system can detect that the first elevator car is fully occupied by detecting that a number of one or more other passengers within the first elevator car prior is equal to a total occupancy limit for the first elevator car prior to the first elevator car arriving to pick up the passenger.

According to one or more embodiments or any of the dynamic car assignment method embodiments above, the elevator system utilizes a sensor to detect an occupancy of the second elevator car to determine whether the occupancy is less than a total occupancy limit for the second elevator car prior to assigning the second elevator car. The elevator system assigns the second elevator car when the occupancy of the second elevator car is less than the total occupancy limit for the second elevator car.

According to one or more embodiments or any of the dynamic car assignment method embodiments above, the elevator system can be in communication with a mobile call of the passenger. The elevator call can be received from a mobile device. The mobile call can be initiated by the passenger requiring one of the plurality of elevators.

According to one or more embodiments or any of the dynamic car assignment method embodiments above, the elevator system can be in communication with a mobile call of the passenger. The elevator system can provide elevator car assignments to a mobile device to cause the mobile device to displaying a prompt indicating the assignment of the first elevator car and to update the prompt to the assignment of the second elevator car.

In addition, any of the dynamic car assignment method embodiments above can be implemented as an elevator system and/or a computer program produce according to one or more embodiments described herein.

Technical effects of embodiments of the present disclosure include improving an ability of the elevator subsystem to manage elevator calls, whether from a hall button of a lobby or an application of a mobile device. In this regard, the embodiments of the present disclosure can automatically re-route and re-assign elevator cars based on occupancy without wasting time of the passengers and wasting operation cycles of the elevator system itself.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The present disclosure is illustrated by way of example and not limited in the accompanying figures in which like reference numerals indicate similar elements.

DETAILED DESCRIPTION

Figure 1:
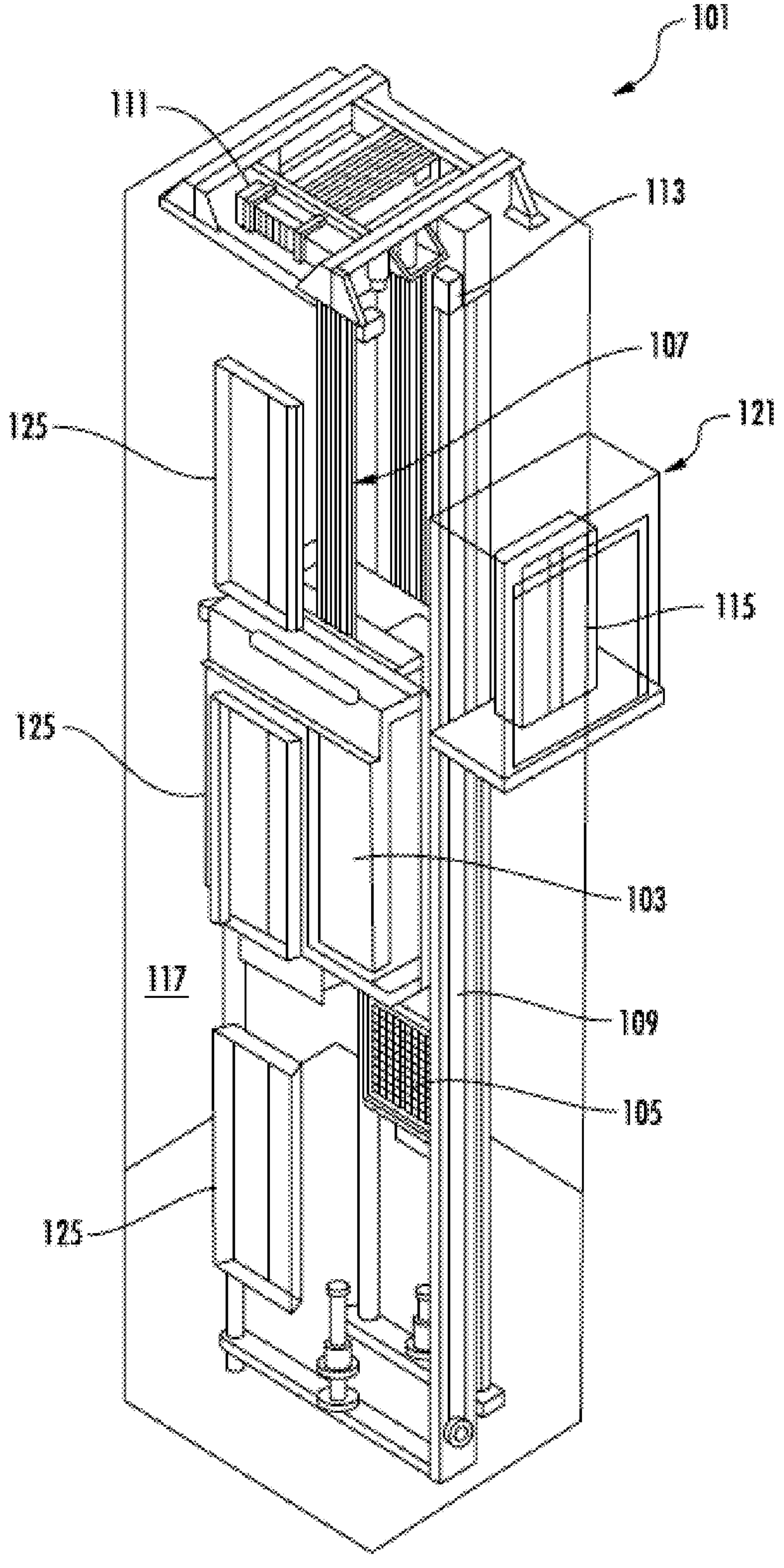
FIG. 1 is a schematic illustration of an elevator system that may employ various embodiments of the present disclosure.

FIG. 1 is a perspective view of an elevator system 101 including an elevator car 103, a counterweight 105, a tension member 107, a guide rail 109, a machine 111, a position reference system 113, and a controller 115. The elevator car 103 and counterweight 105 are connected to each other by the tension member 107. The tension member 107 may include or be configured as, for example, ropes, steel cables, and/or coated-steel belts. The counterweight 105 is configured to balance a load of the elevator car 103 and is configured to facilitate movement of the elevator car 103 concurrently and in an opposite direction with respect to the counterweight 105 within an elevator shaft 117 and along the guide rail 109.

The tension member 107 engages the machine 111, which is part of an overhead structure of the elevator system 101.

The machine 111 is configured to control movement between the elevator car 103 and the counterweight 105. The position reference system 113 may be mounted on a fixed part at the top of the elevator shaft 117, such as on a support or guide rail, and may be configured to provide position signals related to a position of the elevator car 103 within the elevator shaft 117. In other embodiments, the position reference system 113 may be directly mounted to a moving component of the machine 111, or may be located in other positions and/or configurations as known in the art. The position reference system 113 can be any device or mechanism for monitoring a position of an elevator car and/or counter weight, as known in the art. For example, without limitation, the position reference system 113 can be an encoder, sensor, or other system and can include velocity sensing, absolute position sensing, etc., as will be appreciated by those of skill in the art.

The controller 115 is located, as shown, in a controller room 121 of the elevator shaft 117 and is configured to control the operation of the elevator system 101, and particularly the elevator car 103. For example, the controller 115 may provide drive signals to the machine 111 to control the acceleration, deceleration, leveling, stopping, etc. of the elevator car 103. The controller 115 may also be configured to receive position signals from the position reference system 113 or any other desired position reference device. When moving up or down within the elevator shaft 117 along guide rail 109, the elevator car 103 may stop at one or more landings 125 as controlled by the controller 115. Although shown in a controller room 121, those of skill in the art will appreciate that the controller 115 can be located and/or configured in other locations or positions within the elevator system 101. In one embodiment, the controller may be located remotely or in the cloud.

The machine 111 may include a motor or similar driving mechanism. In accordance with embodiments of the disclosure, the machine 111 is configured to include an electrically driven motor. The power supply for the motor may be any power source, including a power grid, which, in combination with other components, is supplied to the motor. The machine 111 may include a traction sheave that imparts force to tension member 107 to move the elevator car 103 within elevator shaft 117.

Although shown and described with a roping system including tension member 107, elevator systems that employ other methods and mechanisms of moving an elevator car within an elevator shaft may employ embodiments of the present disclosure. For example, embodiments may be employed in ropeless elevator systems using a linear motor to impart motion to an elevator car. Embodiments may also be employed in ropeless elevator systems using a hydraulic lift to impart motion to an elevator car. FIG. 1 is merely a non-limiting example presented for illustrative and explanatory purposes.

Figure 2:
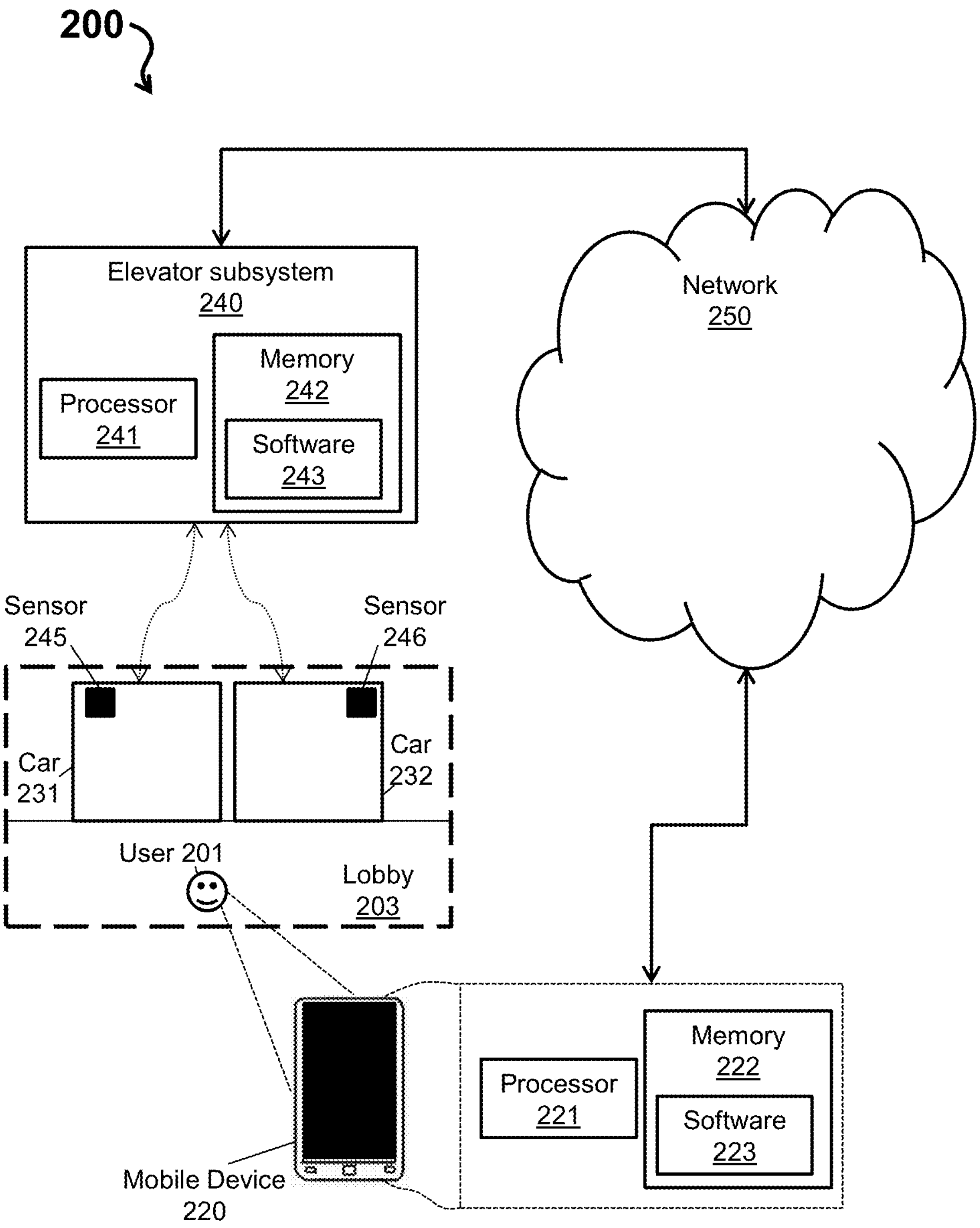
FIG. 2 depicts a schematic illustration of a detection system in accordance with one or more embodiments.

FIG. 2 depicts a schematic illustration of a detection system 200 in accordance with one or more embodiments, which can be realized as processor-implemented methods and/or computer program products. The detection system 200 is overlaid a building through which a user 201 can traverse. As shown in FIG. 2, the user 201 is in a lobby of the building awaiting transportation. The user 201 has a mobile device 220 that is connected to and/or a part of the detection system 200. The mobile device includes a processor 221 and a memory 222 with software 223 (e.g., mobile application) stored thereon. The user 201, further, is awaiting transportation by an elevator car 231 or an elevator car 232 of the detection system 200. The elevator cars 231, 232 are controlled by an elevator subsystem 240 of the detection system 200. The elevator subsystem 240 includes a processor 241 and a memory 242 with software 243 stored thereon (e.g., dispatching software), communicates with one or more sensors 245, 246 associated with the elevator cars 231, 232, and communicates via a network 250 of the detection system 200 with the mobile device 220.

The detection system 200 implements a dynamic car assignment process. The detection system 200 and elements therein may take many different forms and include multiple and/or alternate components and facilities. The detection system 200 is only one example and is not intended to suggest any limitation as to the scope of use or operability of embodiments described herein (indeed additional or alternative components and/or implementations may be used). While single items are illustrated for the detection system 200 (and other items), these representations are not intended to be limiting and thus, any items may represent a plurality of items.

In general, the detection system 200 enhances an experience of the user 201 through the dynamic car assignment process by automatically re-routing and reassigning an elevator call in the backend (e.g., by the elevator subsystem 240) and updating elevator assignment notification on the mobile device 220. In this regard, if an assigned elevator car 231 becomes fully occupied after the elevator call, the elevator subsystem 240 automatically re-routes and re-assigns the elevator car 232 to the user 201 awaiting the elevator car 231 without wasting time and so that the user 291 does not have to send a recall from the mobile device 220 or a hall call from the lobby 203. The elevator subsystem 240, while discussed herein with respect to FIG. 2, is representative of any automated passenger conveying system, such as escalators and/or moving walkways. The detection system 200 communicate signals between the elevator subsystem 240, the network 250, and elements therein to support this rerouting, reassigning, elevator calling, and notifying.

In accordance with one or more embodiments of the disclosure herein, the elevator subsystem 240 is an example of the elevator system 101 of FIG. 1. In this regard, for example, the elevator subsystem 240 includes electromechanical arrangements (e.g., a controller and/or computing device that communicates with at least one motor) that control speed, position, and door operation of an elevator (e.g., of a bank of elevators 231, 232).

The elevator subsystem 240 is in the form of a general-purpose computing device that is improved upon by the operation and functionality of the embodiments described herein. As shown in FIG. 2, the components of the elevator subsystem 240 includes, but are not limited to, the processor 241 and the memory 242 with software 243 stored thereon.

The mobile device 220 can be any computing device for operating the software 223 and interacting with the detection system 200. The mobile device 220 can include a global positioning system or other location technology. The mobile device 220 is only one example of a suitable computing node and is not intended to suggest any limitation as to the scope of use or operability of embodiments described herein (indeed additional or alternative components and/or implementations may be used. That is, the mobile device 220 and elements therein may take many different forms and include multiple and/or alternate components and facilities. For instance, the mobile device 220 can be any and/or employ any number and combination of computing devices and networks utilizing various communication technologies, as described herein. Examples of the mobile device 220 include a mobile phone, a smart phone, a tablet computer, a laptop, etc. As shown in FIG. 2, the components of the mobile device 220 includes, but are not limited to, the processor 221 and the memory 222.

The processors 221, 241 include any processing hardware, software, or combination of hardware and software (utilized by the mobile device 220 and the elevator subsystem 240, respectively) that carries out the computer readable program instructions by performing arithmetical, logical, and/or input/output operations. Examples of the processors 221, 241 include, but are not limited to an arithmetic logic unit, which performs arithmetic and logical operations; a control unit, which extracts, decodes, and executes instructions from a memory; and an array unit, which utilizes multiple parallel computing elements.

The memories 222, 242 are a tangible device that retains and stores computer readable program instructions or at least one program product (e.g., the software 223, 243, respectively) for use by the processors 221, 241 to carry out the operations of embodiments herein. The memories 222, 242 can include a variety of computer system readable media. Such media may be any available media that is accessible and it includes both volatile and non-volatile media, removable and non-removable media.

Each of the software 223 and the software 243 is a set of computer readable instructions stored in the memories 222, 242, respectively, along with an operating system, one or more application programs, other program modules, and program data. In this regard, the processors 221, 241 execute the software 223 and the software 243 on the memories 222, 242, thereby performing one or more processes defined herein. The software 223, more particularly, causes the mobile device 220 to generate elevator calls, support one or more user interfaces, and provide notifications to the user 201, such as is described herein with reference to FIGS. 3-4. The software 243, more particularly, causes the elevator subsystem 240 to dispatch elevators in response to elevator calls, detect elevator occupancy, reassign elevators in response to elevator occupancy, and generate notifications to the mobile device 220, such as is described herein with reference to FIGS. 3-4. Examples of notifications may include, but are not limited to, text messaging, audio alerts, electronic mail, interface alerts, instant messaging, and the like.

The one or more sensors 245, 246 can be any transducer that converts an environmental condition (e.g., temperature, pressure, light, motion, etc.) into electrical signals. Examples of the one or more sensors 245, 246 include thermocouples, strain gauges, optical devices, cameras, etc. The one or more sensors 245, 246 are configured to detect the occupancy of the elevator cars 231, 232. In accordance with one or more embodiments, the one or more sensors 245, 246 are motion sensors arranged at an entrance of the elevator cars 231, 232 that detect the number of passengers (e.g., people and/or object) entering and exiting the elevator cars 231, 232 in relation to a total occupancy limit. In accordance with one or more embodiments, the one or more sensors 245, 246 are stain gauges arranged under a floor of the elevator cars 231, 232 that detect a total weight of the passengers in relation to a weight threshold (corresponding to the total occupancy limit) in the elevator cars 231, 232. In accordance with one or more embodiments, the one or more sensors 245, 246 are cameras arranged in a ceiling of the elevator cars 231, 232 that detect a total number of the passengers through image recognition in the elevator cars 231, 232 in relation to the total occupancy limit.

The network 250 can be a distributed cloud computing environment (e.g., a cloud distribution system) where tasks are performed by remote processing devices that are linked through a communications within the network 250. The network 250 can comprise hardware and/or software that are similar to the computing device 220 described herein. In the network 250, program modules may be located in both local and remote computer system storage media including memory storage devices. Operations of the system 200 will now be described with respect to FIGS. 3-4.

Figure 3:
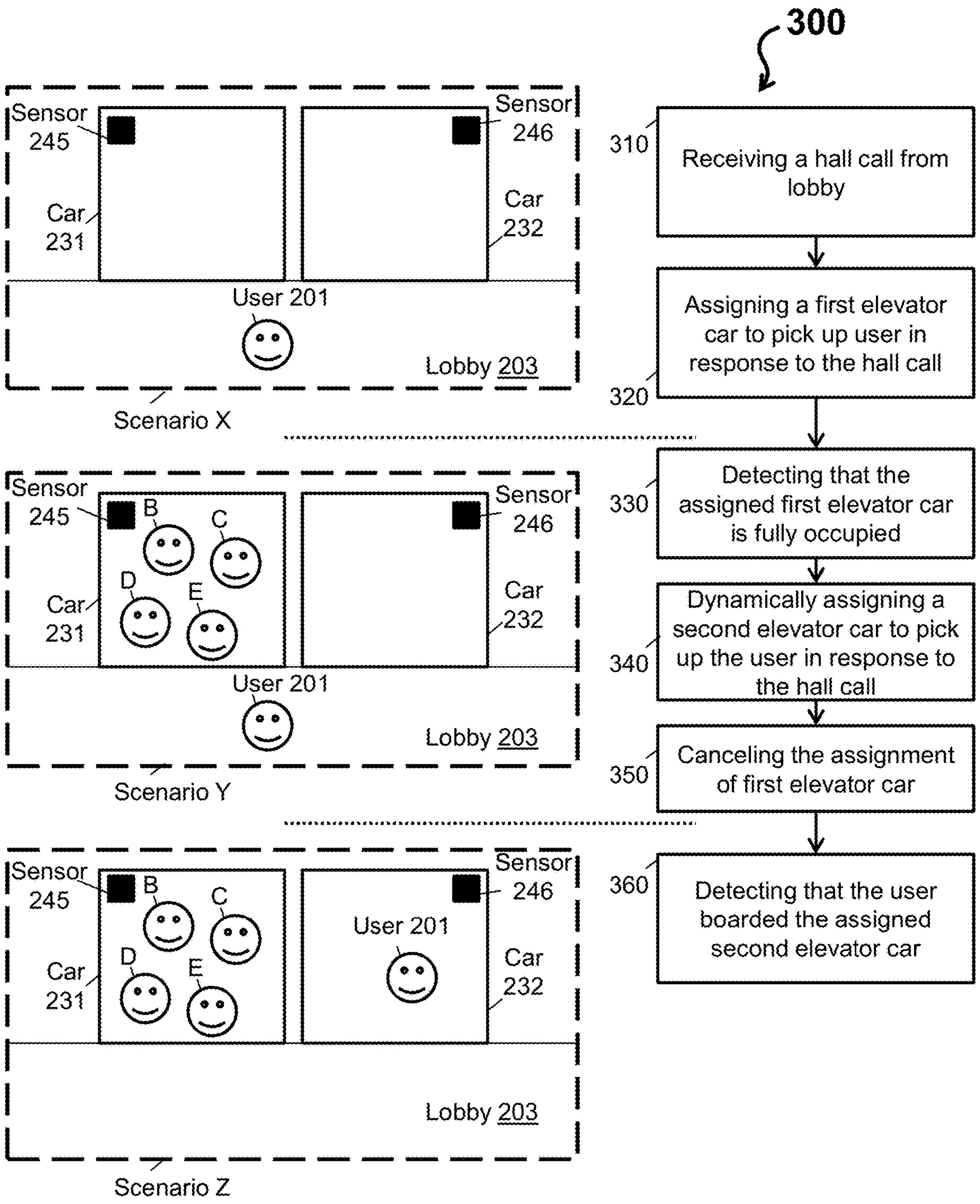
FIG. 3 depicts detection operations with respect to a process flow of a detection system in accordance with one or more embodiments.

FIG. 3 depicts detection operations with respect to a process flow 300 of the detection system 200 in accordance with one or more embodiments. More particularly, the process flow 300 is a dynamic car assignment process where blocks 310 and 320 relate to a Scenario X of the detection system 200, blocks 330, 340, and 350 relates to a Scenario Y of the detection system 200, and block 360 relates to a Scenario Z of the detection system 200.

At block 310, the elevator subsystem 240 receives a hall call from the lobby 203. The hall call is initiated by the user 201 waiting in the lobby 203 for one of the elevator cars 231, 232, which are not located at a same floor as the lobby 203 at the time of the hall call. At block 320, the elevator subsystem 240 assigns the elevator car 231 (e.g., a first elevator car) to pick up the user 201 in response to the hall call. That is, because for each of the elevator cars 231, 232 a total occupancy is four passengers and because the elevator car 231 is unoccupied as shown in Scenario X, the elevator subsystem 240 assigns the elevator car 231.

In an example, prior to assigning the elevator car 231, the elevator subsystem 240 utilizes the sensor 245 to detect an occupancy of the elevator car 231 and determines whether the occupancy is less than the total occupancy limit for the elevator car 231. If the occupancy is less than the total occupancy limit for the elevator car 231, then the elevator subsystem 240 assigns the elevator car 231. If the occupancy is equal to the total occupancy limit for the elevator car 231, then the elevator subsystem 240 transitions the elevator car 232 and repeats the analysis.

At block 330, the elevator subsystem 240 detects that the elevator car 231 (e.g., the assigned first elevator car) is fully occupied. The elevator subsystem 240 detects that the elevator car 231 is fully occupied prior to the elevator car 231 arriving at the lobby 203. For example, the elevator subsystem 240 detects each time one or more other passengers (e.g., one of the users B, C, D, E) enter the elevator car 231 prior to the elevator car 231 arriving at the lobby 203. And, because the elevator car 231 has a total occupancy limit of four passengers before arrival at the lobby 203, the elevator subsystem 240 identifies that the elevator car 231 is fully occupied as shown in Scenario Y.

At block 340, the elevator subsystem 240 dynamically assigns the elevator car 232 (e.g., a second elevator car) to pick up the user 201 in response to the hall call. In an example, prior to assigning the elevator car 232, the elevator subsystem 240 utilizes the sensor 246 to detect an occupancy of the elevator car 232 and determines whether the occupancy is less than the total occupancy limit for the elevator car 232. If the occupancy is less than the total occupancy limit for the elevator car 232, then the elevator subsystem 240 assigns the elevator car 232. At block 350, the elevator subsystem 240 cancels the assignment of the elevator car 231.

At block 360, the elevator subsystem 240 detects that the user 201 boarded the elevator car 232 (e.g., the assigned second elevator car). As shown in Scenario Z, the user 201 has boarded the elevator car 232.

In view of the above, the technical effects and benefits include improving an ability of the elevator subsystem 240 to manage hall calls. In this regard, the detection system 200 can automatically re-routes and re-assigns elevator cars based on occupancy without wasting time of the user 201 and the users B, C, D, E and wasting operation cycles of the elevator subsystem 240 itself.

Figure 4:
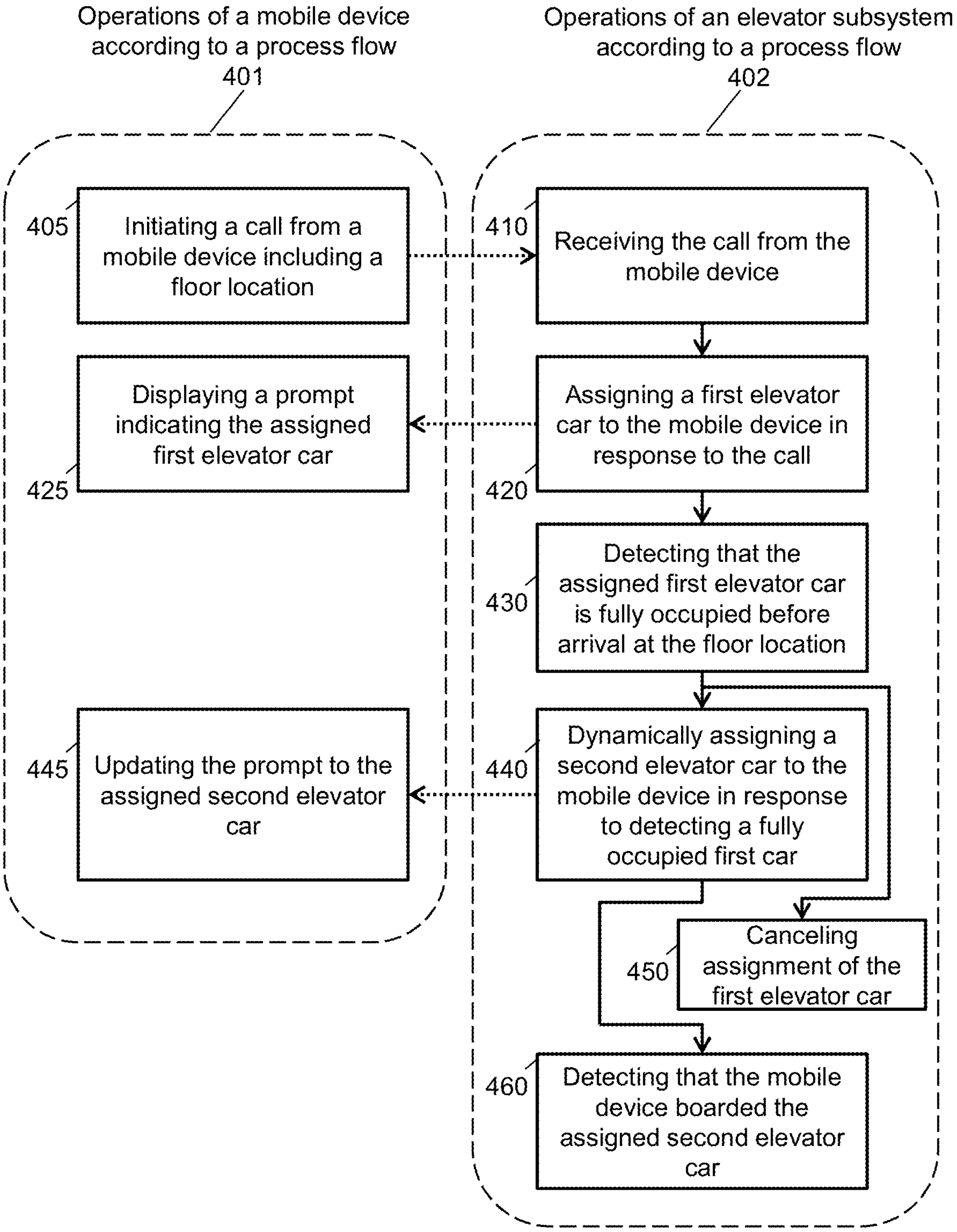
FIG. 4 depicts a process flows of components of a detection system in accordance with one or more embodiments.

FIG. 4 depicts a process flows 401, 402 of components of a detection system in accordance with one or more embodiments. As shown in FIG. 4, operations of the mobile device 220 according to process flow 401 are executed with respect to operations of the elevator subsystem 240 according to process flow 402.

At block 405, a call is initiated from the mobile device 220 including a floor location. In accordance with one or more embodiments, the call can be a mobile call generated by the software 223 in accordance with a user input. The floor location can be pre-determined by the mobile device 220 based on a global positioning system or other location technology.

At block 410, the elevator subsystem 240 receives the call from the mobile device 220. The call can be received via the network 250, such as through cellular technologies. At block 420, the elevator subsystem 240 assigns a first elevator car (e.g., the elevator car 231) to the mobile device 220 in response to the call. That assignment is further communicated to the mobile device 220 by the elevator subsystem 240. At block 425, the mobile device 220 display a prompt indicating the assigned first elevator car.

At block 430, the elevator subsystem 240 detects that the assigned first elevator car is fully occupied before arrival at the floor location. At block 440, the elevator subsystem 240 assigns dynamically assigns a second elevator car (e.g., the elevator car 232) to the mobile device 202 in response to detecting a fully occupied first car. At block 445, the mobile device 220 updates the prompt to the assigned second elevator car.

At block 450, the elevator subsystem 240 cancels assignment of first elevator. At block 460, the elevator subsystem 240 detects that the mobile device 220 boarded the assigned second elevator car. The boarding by the mobile device 220 can be detected by the elevator subsystem 240 based on the sensor 245 communicating with the mobile device and/or a global positioning system or other location technology.

As described above, embodiments can be in the form of processor-implemented processes and devices for practicing those processes, such as a processor. Embodiments can also be in the form of computer program code containing instructions embodied in tangible media, such as network cloud storage, SD cards, flash drives, floppy diskettes, CD ROMs, hard drives, or any other computer-readable storage medium, wherein, when the computer program code is loaded into and executed by a computer, the computer becomes a device for practicing the embodiments. Embodiments can also be in the form of computer program code, for example, whether stored in a storage medium, loaded into and/or executed by a computer, or transmitted over some transmission medium, loaded into and/or executed by a computer, or transmitted over some transmission medium, such as over electrical wiring or cabling, through fiber optics, or via electromagnetic radiation, wherein, when the computer program code is loaded into an executed by a computer, the computer becomes an device for practicing the embodiments. When implemented on a general-purpose microprocessor, the computer program code segments configure the microprocessor to create specific logic circuits.

The term "about" is intended to include the degree of error associated with measurement of the particular quantity and/or manufacturing tolerances based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

Those of skill in the art will appreciate that various example embodiments are shown and described herein, each having certain features in the particular embodiments, but the present disclosure is not thus limited. Rather, the present disclosure can be modified to incorporate any number of variations, alterations, substitutions, combinations, sub-combinations, or equivalent arrangements not heretofore described, but which are commensurate with the scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

What is claimed is:

1. A dynamic car assignment method implemented by an elevator system comprising a plurality of elevators, the dynamic car assignment method comprising:

assigning, by the elevator system, a first elevator car of the plurality of elevators to pick up a passenger in response to an elevator call, wherein the elevator call is a hall call received from a lobby, the hall call being initiated by the passenger waiting in the lobby for one of the plurality of elevators, none of the plurality of the elevators being located at a same floor as the lobby at the time of the hall call;

wherein the elevator system utilizes a sensor to detect an occupancy of the first elevator car to determine whether the occupancy is less than a total occupancy limit for the first elevator car, wherein the elevator system assigns the first elevator car when the occupancy of the first elevator car is less than the total occupancy limit for the first elevator car;

detecting, by the elevator system, that the first elevator car is fully occupied prior to the first elevator car arriving to pick up the passenger; and dynamically assigning, by the elevator system, a second elevator car of the plurality of elevator cars to pick up the passenger in response to the elevator call and in response to detecting that the first elevator car is fully occupied.

2. The dynamic car assignment method of claim 1, wherein the elevator system detects that the first elevator car is fully occupied by detecting that a number of one or more other passengers within the first elevator car prior is equal to a total occupancy limit for the first elevator car prior to the first elevator car arriving to pick up the passenger.

3. The dynamic car assignment method of claim 1, wherein the elevator system utilizes a sensor to detect an occupancy of the second elevator car to determine whether the occupancy is less than a total occupancy limit for the second elevator car prior to assigning the second elevator car, and wherein the elevator system assigns the second elevator car when the occupancy of the second elevator car is less than the total occupancy limit for the second elevator car.

4. The dynamic car assignment method of claim 1, wherein the elevator system is in communication with a mobile call of the passenger, the elevator call is received from a mobile device, the mobile call being initiated by the passenger requiring one of the plurality of elevators.

5. The dynamic car assignment method of claim 1, wherein the elevator system is in communication with a mobile call of the passenger, the elevator system providing elevator car assignments to a mobile device to cause the mobile device to displaying a prompt indicating the assignment of the first elevator car and to update the prompt to the assignment of the second elevator car.

6. An elevator system comprising a plurality of elevators and a processor executing dynamic car assignment software to cause the elevator system to: assign a first elevator car of the plurality of elevators to pick up a passenger in response to an elevator call, wherein the elevator call is a hall call received from a lobby, the hall call being initiated by the passenger waiting in the lobby for one of the plurality of elevators, none of the plurality of the elevators being located at a same floor as the lobby at the time of the hall call;

wherein the elevator system utilizes a sensor to detect an occupancy of the first elevator car to determine whether the occupancy is less than a total occupancy limit for the first elevator car, wherein the elevator system assigns the first elevator car when the occupancy of the first elevator car is less than the total occupancy limit for the first elevator car;

detect that the first elevator car is fully occupied prior to the first elevator car arriving to pick up the passenger; and dynamically assign a second elevator car of the plurality of elevator cars to pick up the passenger in response to the elevator call and in response to detecting that the first elevator car is fully occupied.

7. The elevator system of claim 6, wherein the elevator system detects that the first elevator car is fully occupied by detecting that a number of one or more other passengers within the first elevator car prior is equal to a total occupancy limit for the first elevator car prior to the first elevator car arriving to pick up the passenger.

8. The elevator system of claim 6, wherein the elevator system utilizes a sensor to detect an occupancy of the second elevator car to determine whether the occupancy is less than a total occupancy limit for the second elevator car prior to assigning the second elevator car, and wherein the elevator system assigns the second elevator car when the occupancy of the second elevator car is less than the total occupancy limit for the second elevator car.

9. The elevator system of claim 6, wherein the elevator system is in communication with a mobile call of the passenger, the elevator call is received from a mobile device, the mobile call being initiated by the passenger requiring one of the plurality of elevators.

10. The elevator system of claim 6, wherein the elevator system is in communication with a mobile call of the passenger, the elevator system providing elevator car assignments to a mobile device to cause the mobile device to displaying a prompt indicating the assignment of the first elevator car and to update the prompt to the assignment of the second elevator car.

11. A computer program product comprising a non-transitory computer readable medium storing processor executable instructions for dynamic car assignment, the processor executable instructions being executed by a processor of an elevator system comprising a plurality of elevators to cause the elevator system to:

assign a first elevator car of the plurality of elevators to pick up a passenger in response to an elevator call, wherein the elevator call is a hall call received from a lobby, the hall call being initiated by the passenger waiting in the lobby for one of the plurality of elevators, none of the plurality of the elevators being located at a same floor as the lobby at the time of the hall call;

wherein the elevator system utilizes a sensor to detect an occupancy of the first elevator car to determine whether the occupancy is less than a total occupancy limit for the first elevator car, wherein the elevator system assigns the first elevator car when the occupancy of the first elevator car is less than the total occupancy limit for the first elevator car;

detect that the first elevator car is fully occupied prior to the first elevator car arriving to pick up the passenger; and dynamically assign a second elevator car of the plurality of elevator cars to pick up the passenger in response to the elevator call and in response to detecting that the first elevator car is fully occupied.

12. The computer program product of claim 11, wherein the elevator system detects that the first elevator car is fully occupied by detecting that a number of one or more other passengers within the first elevator car prior is equal to a total occupancy limit for the first elevator car prior to the first elevator car arriving to pick up the passenger.

13. The computer program product of claim 11, wherein the elevator system utilizes a sensor to detect an occupancy of the second elevator car to determine whether the occupancy is less than a total occupancy limit for the second elevator car prior to assigning the second elevator car, and wherein the elevator system assigns the second elevator car when the occupancy of the second elevator car is less than the total occupancy limit for the second elevator car.

14. The computer program product of claim 11, wherein the elevator system is in communication with a mobile call of the passenger, the elevator call is received from a mobile device, the mobile call being initiated by the passenger requiring one of the plurality of elevators.

* * * * *